United States Patent
Cox et al.

(10) Patent No.: US 8,894,858 B1
(45) Date of Patent: Nov. 25, 2014

(54) METHOD AND ASSEMBLY FOR WATER FILTRATION USING A TUBE MANIFOLD TO MINIMIZE BACKWASH

(71) Applicant: Evoqua Water Technologies LLC, Alpharetta, GA (US)

(72) Inventors: David John Cox, Penrith (AU); Warren Thomas Johnson, Grose Wold (AU)

(73) Assignee: Evoqua Water Technologies LLC, Warrendale, PA (US)

( * ) Notice: Subject to any disclaimer, the term of this patent is extended or adjusted under 35 U.S.C. 154(b) by 0 days.

(21) Appl. No.: 14/332,272

(22) Filed: Jul. 15, 2014

Related U.S. Application Data

(62) Division of application No. 12/064,409, filed as application No. PCT/AU2006/001215 on Aug. 22, 2006.

(30) Foreign Application Priority Data

Aug. 22, 2005 (AU) .................. 2005904552

(51) Int. Cl.
  *B01D 61/18* (2006.01)
  *B01D 61/22* (2006.01)
  *B01D 61/20* (2006.01)
  *B01D 63/02* (2006.01)
  *B01D 65/02* (2006.01)

(52) U.S. Cl.
  CPC ............ *B01D 63/02* (2013.01); *B01D 2321/16* (2013.01); *B01D 2313/26* (2013.01);
  (Continued)

(58) Field of Classification Search
  CPC ........ B01D 61/18; B01D 63/02; B01D 65/02; B01D 2315/18; B01D 2315/20; B01D 2321/04; B01D 2321/185; B01D 2313/18; B01D 2313/20; B01D 2313/26; B01D 2315/06
  USPC ............... 210/321.72, 321.78, 321.79, 321.8, 210/321.87, 321.88, 321.89, 500.23, 636, 210/637, 106, 108, 123, 136, 104, 257.2, 210/258, 407, 409, 410, 411, 412, 416.1, 210/416.3, 418, 419; 96/7–11
  See application file for complete search history.

(56) References Cited

U.S. PATENT DOCUMENTS 256,008 A  4/1882  Leak
285,321 A  9/1883  Tams
(Continued)

FOREIGN PATENT DOCUMENTS

AU  34400/84 A  4/1985
AU  55847/86 A  9/1986
(Continued)

OTHER PUBLICATIONS

Almulla et al., "Developments in high recovery brackish water desalination plants as part of the solution to water quantity problems," Desalination, 153 (2002), pp. 237-243.
(Continued)

*Primary Examiner* — David C Mellon

(57) ABSTRACT

A method of filtering a feed liquid in a membrane filtration assembly is provided comprising introducing feed liquid to be treated into a filtration chamber of a membrane filtration system including a membrane module having one or more permeable hollow membranes, the module being located in the filtration chamber, and the filtration chamber having an open upper end located above an upper header of the membrane module and a closed lower end, and feed tank surrounding the filtration chamber. The feed tank may be configured to provide the feed liquid through the open upper end of the filtration chamber, and the feed liquid may be applied to the surface of the membranes within the membrane module and withdrawn from the lumens of the membranes as filtrate.

22 Claims, 4 Drawing Sheets

(52) U.S. Cl.
CPC ........ *B01D 2315/06* (2013.01); *B01D 2313/18* (2013.01); *B01D 2313/90* (2013.01); *B01D 61/18* (2013.01); *B01D 2313/20* (2013.01); *B01D 2313/48* (2013.01); *B01D 2321/04* (2013.01); *B01D 2321/10* (2013.01); *B01D 65/02* (2013.01); *B01D 2315/18* (2013.01)
USPC .......................... 210/636; 210/637; 210/108

(56) References Cited

U.S. PATENT DOCUMENTS

| | | | |
|---|---|---|---|
| 511,995 A * | 1/1894 | Buckley | ........................ 210/120 |
| 1,997,074 A | 4/1935 | Novotny | |
| 2,080,783 A | 5/1937 | Petersen | |
| 2,105,700 A | 1/1938 | Ramage | |
| 2,843,038 A | 7/1958 | Manspeaker | |
| 2,926,086 A | 2/1960 | Chenicek et al. | |
| 3,068,655 A | 12/1962 | Murray et al. | |
| 3,139,401 A | 6/1964 | Hach | |
| 3,183,191 A | 5/1965 | Hach | |
| 3,191,674 A | 6/1965 | Richardson | |
| 3,198,636 A | 8/1965 | Bouthilet | |
| 3,228,876 A | 1/1966 | Mahon | |
| 3,275,554 A | 9/1966 | Wagenaar | |
| 3,442,002 A | 5/1969 | Geary et al. | |
| 3,462,362 A | 8/1969 | Kollsman | |
| 3,472,168 A | 10/1969 | Inoue et al. | |
| 3,472,765 A | 10/1969 | Budd et al. | |
| 3,492,698 A | 2/1970 | Geary et al. | |
| 3,501,798 A | 3/1970 | Carraro | |
| 3,505,215 A | 4/1970 | Bray | |
| 3,556,305 A | 1/1971 | Shorr | |
| 3,563,860 A | 2/1971 | Henderyckx | |
| 3,591,010 A | 7/1971 | Pall et al. | |
| 3,625,827 A | 12/1971 | Wildi et al. | |
| 3,654,147 A | 4/1972 | Levin | |
| 3,679,052 A * | 7/1972 | Asper | ........................ 210/777 |
| 3,693,406 A | 9/1972 | Tobin, III | |
| 3,700,561 A | 10/1972 | Ziffer | |
| 3,700,591 A | 10/1972 | Higley | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,795,609 A | 3/1974 | Hill et al. | |
| 3,804,258 A | 4/1974 | Okuniewski et al. | |
| 3,843,809 A | 10/1974 | Luck | |
| 3,876,738 A | 4/1975 | Marinaccio et al. | |
| 3,912,624 A | 10/1975 | Jennings | |
| 3,955,998 A | 5/1976 | Clampitt et al. | |
| 3,968,192 A | 7/1976 | Hoffman, III et al. | |
| 3,982,095 A | 9/1976 | Robinson | |
| 3,992,301 A | 11/1976 | Shippey et al. | |
| 3,993,816 A | 11/1976 | Baudet et al. | |
| 4,049,765 A | 9/1977 | Yamazaki | |
| 4,076,656 A | 2/1978 | White et al. | |
| 4,082,683 A | 4/1978 | Galesloot | |
| 4,105,556 A | 8/1978 | O'Amaddio et al. | |
| 4,105,731 A | 8/1978 | Yamazaki | |
| 4,107,043 A | 8/1978 | McKinney | |
| 4,138,460 A | 2/1979 | Tigner | |
| 4,157,899 A | 6/1979 | Wheaton | |
| 4,183,890 A | 1/1980 | Bollinger | |
| 4,188,817 A | 2/1980 | Steigelmann | |
| 4,190,411 A | 2/1980 | Fujimoto | |
| 4,190,419 A | 2/1980 | Bauer | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,243,525 A | 1/1981 | Greenberg | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,272,379 A | 6/1981 | Pollock | |
| 4,302,336 A | 11/1981 | Kawaguchi et al. | |
| 4,315,819 A | 2/1982 | King et al. | |
| 4,323,453 A | 4/1982 | Zampini | |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,367,139 A | 1/1983 | Graham | |
| 4,367,140 A | 1/1983 | Wilson | |
| 4,369,605 A | 1/1983 | Opersteny et al. | |
| 4,371,427 A | 2/1983 | Holler et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,405,688 A | 9/1983 | Lowery et al. | |
| 4,407,975 A | 10/1983 | Yamaguchi | |
| 4,414,113 A | 11/1983 | LaTerra | |
| 4,414,172 A | 11/1983 | Leason | |
| 4,415,452 A | 11/1983 | Heil et al. | |
| 4,431,545 A | 2/1984 | Pall et al. | |
| 4,451,369 A | 5/1984 | Sekino et al. | |
| 4,462,855 A | 7/1984 | Yankowsky et al. | |
| 4,467,001 A | 8/1984 | Coplan et al. | |
| 4,476,015 A | 10/1984 | Schmitt et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Muller | |
| 4,519,909 A | 5/1985 | Castro | |
| 4,539,940 A | 9/1985 | Young | |
| 4,540,490 A | 9/1985 | Shibata et al. | |
| 4,545,862 A | 10/1985 | Gore et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,460 A | 11/1986 | Kuzumoto et al. | |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,650,596 A | 3/1987 | Schlueter et al. | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,830 A | 10/1987 | Makino et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,756,875 A | 7/1988 | Tajima et al. | |
| 4,763,612 A | 8/1988 | Iwanami | |
| 4,767,539 A | 8/1988 | Ford | |
| 4,769,140 A | 9/1988 | van Dijk et al. | |
| 4,774,132 A | 9/1988 | Joffee et al. | |
| 4,775,471 A | 10/1988 | Nagai et al. | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,187 A | 1/1989 | Davis et al. | |

(56) References Cited

U.S. PATENT DOCUMENTS

| | | | |
|---|---|---|---|
| 4,797,211 A | 1/1989 | Ehrfeld et al. | |
| 4,800,019 A | 1/1989 | Bikson et al. | |
| 4,810,384 A | 3/1989 | Fabre | |
| 4,812,235 A | 3/1989 | Seleman et al. | |
| 4,816,160 A | 3/1989 | Ford et al. | |
| 4,824,563 A | 4/1989 | Iwahori et al. | |
| 4,834,998 A | 5/1989 | Shrikhande | |
| 4,839,048 A | 6/1989 | Reed et al. | |
| 4,840,227 A | 6/1989 | Schmidt | |
| 4,846,970 A | 7/1989 | Bertelsen et al. | |
| 4,867,883 A | 9/1989 | Daigger et al. | |
| 4,876,006 A | 10/1989 | Ohkubo et al. | |
| 4,876,012 A | 10/1989 | Kopp et al. | |
| 4,886,601 A * | 12/1989 | Iwatsuka et al. | 210/321.79 |
| 4,888,115 A | 12/1989 | Marinaccio et al. | |
| 4,889,620 A | 12/1989 | Schmit et al. | |
| 4,904,426 A | 2/1990 | Lundgard et al. | |
| 4,908,114 A | 3/1990 | Ayers | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,952,317 A | 8/1990 | Culkin | |
| 4,963,304 A | 10/1990 | Im et al. | |
| 4,966,699 A | 10/1990 | Sasaki et al. | |
| 4,968,430 A | 11/1990 | Hildenbrand et al. | |
| 4,968,733 A | 11/1990 | Muller et al. | |
| 4,969,997 A | 11/1990 | Kluver et al. | |
| 4,980,066 A | 12/1990 | Slegers | |
| 4,988,444 A | 1/1991 | Applegate et al. | |
| 4,999,038 A | 3/1991 | Lundberg | |
| 5,002,666 A * | 3/1991 | Matsumoto et al. | 210/321.61 |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |
| 5,059,317 A | 10/1991 | Marius et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,069,353 A | 12/1991 | Espenan | |
| 5,075,044 A | 12/1991 | Augem | |
| 5,075,065 A | 12/1991 | Effenberger et al. | |
| 5,076,925 A | 12/1991 | Roesink et al. | |
| 5,079,272 A | 1/1992 | Allegrezza, Jr. et al. | |
| 5,080,770 A | 1/1992 | Culkin | |
| 5,094,750 A | 3/1992 | Kopp et al. | |
| 5,094,867 A | 3/1992 | Detering et al. | |
| 5,098,567 A | 3/1992 | Nishiguchi | |
| 5,102,550 A | 4/1992 | Pizzino et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,156,738 A | 10/1992 | Maxson | |
| 5,158,721 A | 10/1992 | Allegrezza, Jr. et al. | |
| 5,169,528 A | 12/1992 | Karbachsch et al. | |
| 5,169,530 A | 12/1992 | Schucker et al. | |
| 5,180,407 A | 1/1993 | DeMarco | |
| 5,182,019 A | 1/1993 | Cote et al. | |
| 5,186,821 A | 2/1993 | Murphy | |
| 5,192,442 A | 3/1993 | Piccirillo et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,203,405 A | 4/1993 | Gentry et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,244,579 A | 9/1993 | Horner et al. | |
| 5,248,424 A | 9/1993 | Cote et al. | |
| 5,262,054 A | 11/1993 | Wheeler | |
| 5,269,919 A | 12/1993 | von Medlin | |
| 5,271,830 A | 12/1993 | Faivre et al. | |
| 5,275,766 A | 1/1994 | Gadkaree et al. | |
| 5,286,324 A | 2/1994 | Kawai et al. | |
| 5,290,451 A | 3/1994 | Koster et al. | |
| 5,290,457 A | 3/1994 | Karbachsch et al. | |
| 5,297,420 A | 3/1994 | Gilliland et al. | |
| 5,316,671 A | 5/1994 | Murphy | |
| 5,320,760 A | 6/1994 | Freund et al. | |
| 5,353,630 A | 10/1994 | Soda et al. | |
| 5,354,470 A | 10/1994 | Seita et al. | |
| 5,358,732 A | 10/1994 | Seifter et al. | |
| 5,361,625 A | 11/1994 | Ylvisaker | |
| 5,364,527 A | 11/1994 | Zimmermann et al. | |
| 5,364,529 A | 11/1994 | Morin et al. | |
| 5,374,353 A | 12/1994 | Murphy | |
| 5,389,260 A | 2/1995 | Hemp et al. | |
| 5,393,433 A | 2/1995 | Espenan et al. | |
| 5,396,019 A | 3/1995 | Sartori et al. | |
| 5,401,401 A | 3/1995 | Hickok et al. | |
| 5,401,405 A | 3/1995 | McDougald | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,425,415 A | 6/1995 | Master et al. | |
| 5,451,317 A | 9/1995 | Ishida et al. | |
| 5,458,779 A | 10/1995 | Odegaard | |
| 5,468,397 A | 11/1995 | Barboza et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,490,939 A | 2/1996 | Gerigk et al. | |
| 5,491,023 A | 2/1996 | Tsai et al. | |
| 5,501,798 A | 3/1996 | Al-Samadi et al. | |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,552,047 A | 9/1996 | Oshida et al. | |
| 5,554,283 A | 9/1996 | Brinda et al. | |
| 5,556,591 A | 9/1996 | Jallerat et al. | |
| 5,575,963 A | 11/1996 | Soffer et al. | |
| 5,597,732 A | 1/1997 | Bryan-Brown | |
| 5,607,593 A | 3/1997 | Cote et al. | |
| 5,626,755 A | 5/1997 | Keyser et al. | |
| 5,629,084 A | 5/1997 | Moya | |
| 5,633,163 A | 5/1997 | Cameron | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,670,053 A | 9/1997 | Collentro et al. | |
| 5,677,360 A | 10/1997 | Yamamori et al. | |
| 5,688,460 A | 11/1997 | Ruschke | |
| 5,690,830 A | 11/1997 | Ohtani et al. | |
| 5,733,456 A | 3/1998 | Okey et al. | |
| 5,744,037 A | 4/1998 | Fujimura et al. | |
| 5,747,605 A | 5/1998 | Breant et al. | |
| 5,766,479 A | 6/1998 | Collentro et al. | |
| D396,046 S | 7/1998 | Scheel et al. | |
| 5,783,083 A * | 7/1998 | Henshaw et al. | 210/636 |
| D396,726 S | 8/1998 | Sadr et al. | |
| 5,814,234 A | 9/1998 | Bower et al. | |
| D400,890 S | 11/1998 | Gambardella | |
| 5,843,069 A | 12/1998 | Butler et al. | |
| 5,846,424 A | 12/1998 | Khudenko | |
| 5,846,425 A | 12/1998 | Whiteman | |

(56) References Cited

U.S. PATENT DOCUMENTS

| | | | |
|---|---|---|---|
| 5,871,823 A | 2/1999 | Anders et al. | |
| 5,888,401 A | 3/1999 | Nguyen | |
| 5,895,521 A | 4/1999 | Otsuka et al. | |
| 5,895,570 A | 4/1999 | Liang | |
| 5,906,739 A | 5/1999 | Osterland et al. | |
| 5,906,742 A | 5/1999 | Wang et al. | |
| 5,910,250 A | 6/1999 | Mahendran et al. | |
| 5,914,039 A | 6/1999 | Mahendran et al. | |
| 5,918,264 A | 6/1999 | Drummond et al. | |
| 5,942,113 A | 8/1999 | Morimura | |
| 5,944,997 A | 8/1999 | Pedersen et al. | |
| 5,951,878 A | 9/1999 | Astrom | |
| 5,958,243 A | 9/1999 | Lawrence et al. | |
| 5,961,830 A | 10/1999 | Barnett | |
| 5,968,357 A | 10/1999 | Doelle et al. | |
| 5,988,400 A | 11/1999 | Karachevtcev et al. | |
| 5,989,428 A | 11/1999 | Goronszy | |
| 5,997,745 A | 12/1999 | Tonelli et al. | |
| 6,001,254 A | 12/1999 | Espenan et al. | |
| 6,007,712 A | 12/1999 | Tanaka et al. | |
| 6,017,451 A | 1/2000 | Kopf | |
| 6,024,872 A | 2/2000 | Mahendran et al. | |
| 6,036,030 A | 3/2000 | Stone et al. | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,162,020 A | 12/2000 | Kondo | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,217,770 B1 | 4/2001 | Haney et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 | 12/2001 | Pedersen et al. | |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 * | 10/2002 | Yanou et al. | 210/651 |
| 6,485,645 B1 | 11/2002 | Husain et al. | |
| 6,495,041 B2 | 12/2002 | Taniguchi et al. | |
| 6,517,723 B1 * | 2/2003 | Daigger et al. | 210/605 |
| 6,524,481 B2 | 2/2003 | Zha et al. | |
| 6,524,733 B1 | 2/2003 | Nonobe | |
| 6,550,747 B2 | 4/2003 | Rabie et al. | |
| 6,555,005 B1 | 4/2003 | Zha et al. | |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Chisholm et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Cote et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B2 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,840,251 B2 | 1/2005 | Gill et al. | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 | 3/2005 | Liu et al. | |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 | 8/2005 | DeMarco | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |

(56) References Cited

U.S. PATENT DOCUMENTS

| | | |
|---|---|---|
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1* | 2/2004 | Vossenkaul et al. ....... 210/321.6 |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0092674 A1 | 5/2005 | Mahendran et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |

(56) References Cited

U.S. PATENT DOCUMENTS

| | | |
|---|---|---|
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898Y Y | 8/1995 |
| CN | 2236049Y Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |

(56) References Cited

FOREIGN PATENT DOCUMENTS

| | | |
|---|---|---|
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 | 7/1992 |
| JP | 04187224 A | 7/1992 |
| JP | 4-256425 | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |

(56) References Cited

FOREIGN PATENT DOCUMENTS

| | | | |
|---|---|---|---|
| JP | 11309351 | A | 11/1999 |
| JP | 11319501 | A | 11/1999 |
| JP | 11319507 | A | 11/1999 |
| JP | 11333265 | A | 12/1999 |
| JP | 2000000439 | A | 1/2000 |
| JP | 200051670 | | 2/2000 |
| JP | 2000051669 | A | 2/2000 |
| JP | 2000061466 | A | 2/2000 |
| JP | 200079390 | A | 3/2000 |
| JP | 2000070684 | A | 3/2000 |
| JP | 2000093758 | | 4/2000 |
| JP | 2000157845 | | 6/2000 |
| JP | 2000157850 | A | 6/2000 |
| JP | 2000185220 | A | 7/2000 |
| JP | 2000189958 | A | 7/2000 |
| JP | 2000233020 | A | 8/2000 |
| JP | 2000237548 | A | 9/2000 |
| JP | 2000300968 | A | 10/2000 |
| JP | 2000317276 | A | 11/2000 |
| JP | 2000334276 | A | 12/2000 |
| JP | 2000342932 | A | 12/2000 |
| JP | 2001009246 | A | 1/2001 |
| JP | 2001070967 | A | 3/2001 |
| JP | 2001079366 | A | 3/2001 |
| JP | 2001079367 | A | 3/2001 |
| JP | 2001104760 | A | 4/2001 |
| JP | 2001120963 | A | 5/2001 |
| JP | 2001-510396 | T | 7/2001 |
| JP | 2001179059 | A | 7/2001 |
| JP | 2001179060 | A | 7/2001 |
| JP | 2001190937 | A | 7/2001 |
| JP | 2001190938 | A | 7/2001 |
| JP | 2001205055 | A | 7/2001 |
| JP | 2001212587 | A | 8/2001 |
| JP | 2001232160 | A | 8/2001 |
| JP | 2001-269546 | | 10/2001 |
| JP | 2002011472 | A | 1/2002 |
| JP | 2002143849 | A | 5/2002 |
| JP | 2002177746 | A | 6/2002 |
| JP | 3302992 | B2 | 7/2002 |
| JP | 2002525197 | T | 8/2002 |
| JP | 2002527229 | A | 8/2002 |
| JP | 2002263407 | A | 9/2002 |
| JP | 2002-336663 | | 11/2002 |
| JP | 2003024751 | | 1/2003 |
| JP | 2003047830 | A | 2/2003 |
| JP | 2003053157 | A | 2/2003 |
| JP | 2003053160 | A | 2/2003 |
| JP | 200371254 | A | 3/2003 |
| JP | 2003062436 | A | 3/2003 |
| JP | 2003135935 | A | 5/2003 |
| JP | 2003190976 | A | 7/2003 |
| JP | 2003-265597 | | 9/2003 |
| JP | 2003-275548 | A | 9/2003 |
| JP | 2003266072 | A | 9/2003 |
| JP | 2003275759 | A | 9/2003 |
| JP | 2003340250 | A | 12/2003 |
| JP | 2004008981 | | 1/2004 |
| JP | 2004073950 | A | 3/2004 |
| JP | 2004-230287 | A | 8/2004 |
| JP | 2004216263 | A | 8/2004 |
| JP | 2004230280 | A | 8/2004 |
| JP | 2004249168 | A | 9/2004 |
| JP | 2004322100 | A | 11/2004 |
| JP | 2004-536710 | A | 12/2004 |
| JP | 2004337730 | A | 12/2004 |
| JP | 2005-502467 | A | 1/2005 |
| JP | 2005-087887 | A | 4/2005 |
| JP | 2005144291 | A | 6/2005 |
| JP | 2005154551 | A | 6/2005 |
| JP | 2005279447 | A | 10/2005 |
| JP | 2006116495 | | 5/2006 |
| JP | 2007547083 | | 8/2010 |
| JP | 4833353 | B2 | 12/2011 |
| KR | 20-0232145 | | 7/2001 |
| KR | 1020020067227 | | 8/2002 |
| KR | 20-0295350 | | 11/2002 |
| KR | 2002-0090967 | | 12/2002 |
| KR | 2003-033812 | | 5/2003 |
| KR | 2003-060625 | | 7/2003 |
| KR | 2005-063478 | | 6/2005 |
| NL | 1006390 | C2 | 12/1998 |
| NL | 1020491 | C | 10/2003 |
| NL | 1021197 | C | 10/2003 |
| NO | 20053769 | A | 2/2006 |
| NZ | 510394 | A | 5/2003 |
| NZ | 537874 | A | 2/2007 |
| TW | 347343 | | 12/1998 |
| WO | 8501449 | A1 | 4/1985 |
| WO | 8605116 | A1 | 9/1986 |
| WO | 8605705 | A1 | 10/1986 |
| WO | 8800494 | A1 | 1/1988 |
| WO | 8801529 | A1 | 3/1988 |
| WO | 8801895 | A1 | 3/1988 |
| WO | 8806200 | A1 | 8/1988 |
| WO | 8900880 | A1 | 2/1989 |
| WO | 9000434 | A1 | 1/1990 |
| WO | 9104783 | A1 | 4/1991 |
| WO | 9116124 | A1 | 10/1991 |
| WO | 9302779 | A1 | 2/1993 |
| WO | 9315827 | A1 | 8/1993 |
| WO | 9323152 | A1 | 11/1993 |
| WO | 9411094 | A1 | 5/1994 |
| WO | 9511736 | A1 | 5/1995 |
| WO | 9534424 | A1 | 12/1995 |
| WO | 9603202 | A1 | 2/1996 |
| WO | 9607470 | A1 | 3/1996 |
| WO | 9628236 | A1 | 9/1996 |
| WO | 9629142 | A1 | 9/1996 |
| WO | 9641676 | A1 | 12/1996 |
| WO | 9706880 | A2 | 2/1997 |
| WO | 9822204 | A1 | 5/1998 |
| WO | 9825694 | A1 | 6/1998 |
| WO | 9828066 | A1 | 7/1998 |
| WO | 9853902 | A1 | 12/1998 |
| WO | 9901207 | A1 | 1/1999 |
| WO | 99-55448 | A1 | 11/1999 |
| WO | 9959707 | A1 | 11/1999 |
| WO | 0018498 | A1 | 4/2000 |
| WO | 0030742 | A1 | 6/2000 |
| WO | 0100307 | A2 | 1/2001 |
| WO | 0105715 | A1 | 1/2001 |
| WO | 0108790 | A1 | 2/2001 |
| WO | 0119414 | A1 | 3/2001 |
| WO | 0132299 | A1 | 5/2001 |
| WO | 0136075 | A1 | 5/2001 |
| WO | 0143856 | A1 | 6/2001 |
| WO | 0145829 | A1 | 6/2001 |
| WO | 0226363 | A2 | 4/2002 |
| WO | 0230550 | A1 | 4/2002 |
| WO | 0240140 | A1 | 5/2002 |
| WO | 0247800 | A1 | 6/2002 |
| WO | 03000389 | A2 | 1/2003 |
| WO | 03013706 | A1 | 2/2003 |
| WO | 03024575 | A1 | 3/2003 |
| WO | 03053552 | A1 | 7/2003 |
| WO | 03057632 | A1 | 7/2003 |
| WO | 03059495 | A1 | 7/2003 |
| WO | 03068374 | A1 | 8/2003 |
| WO | 03095078 | A1 | 11/2003 |
| WO | 2004018084 | A1 | 3/2004 |
| WO | 2004024304 | A2 | 3/2004 |
| WO | 2004033078 | A1 | 4/2004 |
| WO | 2004050221 | A1 | 6/2004 |
| WO | 2004056458 | A3 | 7/2004 |
| WO | 2004078327 | A1 | 9/2004 |
| WO | 2004101120 | A1 | 11/2004 |
| WO | 2005005028 | A1 | 1/2005 |
| WO | 2005021140 | A1 | 3/2005 |
| WO | 2005028085 | A1 | 3/2005 |
| WO | 2005028086 | A1 | 3/2005 |
| WO | 2005037414 | A1 | 4/2005 |
| WO | 2005046849 | A1 | 5/2005 |
| WO | 2005077499 | A1 | 8/2005 |

(56) References Cited

FOREIGN PATENT DOCUMENTS

| | | | |
|---|---|---|---|
| WO | 2005082498 | A1 | 9/2005 |
| WO | 2005107929 | A2 | 11/2005 |
| WO | 2006026814 | A1 | 3/2006 |
| WO | 2006029456 | A1 | 3/2006 |
| WO | 2006029465 | | 3/2006 |
| WO | 2006047814 | A1 | 5/2006 |
| WO | 2006066350 | A1 | 6/2006 |
| WO | 2006126833 | A1 | 11/2006 |
| WO | 2007022576 | A1 | 3/2007 |
| WO | 2007053528 | A2 | 5/2007 |
| WO | 2007065956 | A1 | 6/2007 |
| WO | 2007073080 | A1 | 6/2007 |
| WO | 2007135087 | A1 | 11/2007 |
| WO | 2008025077 | A1 | 3/2008 |
| WO | 2008034570 | A1 | 3/2008 |
| WO | 2008071516 | A1 | 6/2008 |
| WO | 2008141080 | A1 | 11/2008 |
| WO | 2008153818 | A1 | 12/2008 |
| WO | 2009030405 | A1 | 3/2009 |

OTHER PUBLICATIONS

Anonymous, "Nonwoven Constructions of Dyneon™ THV and Dyneon™ HTE Fluorothermoplastics", Research Disclosure Journal, Apr. 1999, RD 420013, 2 pages.
Chinese Office Action dated Sep. 8, 2010 for Application No. 200680038349.8.
Chinese Office Action for corresponding Chinese Application No. 200680038349.8 issued Aug. 12, 2010 with partial English translation.
Chinese Second Office Action dated Sep. 7, 2011 for Application No. 200680038349.8.
Chinese Third Office Action dated May 3, 2012 for Application No. 200680038349.8.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Delgrange-Vincent et al., "Neural networks for long term prediction of fouling and backwash efficiency in ultrafiltration for drinking water production," Desalination 131 (2000) pp. 353-362.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
International Report on Patentability dated Dec. 5, 2007 for Application No. PCT/AU2006/001215.
International Search Report dated Sep. 21, 2006 for Application No. PCT/AU2006/001215.
Japanese Office Action dated Apr. 3, 2012 for Application No. 2008-527267.
Jones, Craig, "Applications of Hydrogen Peroxide and Derivatives," The Royal Society of Chemistry, Cambridge, UK 1999, Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Mark et al., "Peroxides and Peroxy Compounds, Inorganic," Kirk-Othmer Encyclopedia of Chemical Technology, Peroxides and Peroxy Compounds, Inorganic, to Piping Systems, New York, Wiley & Sons, Ed., Jan. 1, 1978, pp. 14-18.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
White et al., "Optimisation of intermittently operated microfiltration processes," The Chemical Engineering Journal, 52 (1993), pp. 73-77.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.

\* cited by examiner

METHOD AND ASSEMBLY FOR WATER FILTRATION USING A TUBE MANIFOLD TO MINIMIZE BACKWASH

CROSS-REFERENCE TO RELATED APPLICATIONS

This application claims the benefit under 35 U.S.C. §120 as a division of U.S. patent application Ser. No. 12/064,409 filed on Feb. 21, 2008, titled "ASSEMBLY FOR WATER FILTRATION USING A TUBE MANIFOLD TO MINIMISE BACKWASH," which is a U.S. national stage application that claims priority under 35 U.S.C. §371 to International Application No. PCT/AU2006/001215 filed on Aug. 22, 2006, titled "AN ASSEMBLY FOR WATER FILTRATION USING A TUBE MANIFOLD TO MINIMISE BACKWASH," that claims priority to Australian Provisional Application Serial No. 2005904552, titled "AN ASSEMBLY FOR WATER FILTRATION USING A TUBE MANIFOLD TO MINIMISE BACKWASH," filed Aug. 22, 2005, each of which is herein incorporated by reference in their entirety for all purposes.

TECHNICAL FIELD

The present invention relates to membrane filtration systems and methods and, more particularly, to a system and method that allows for filtration under gravity, under pressure or using a high feed head while minimizing the backwash and cleaning solution volume.

BACKGROUND OF THE INVENTION

In a membrane filtration operation, periodically cleaning the membrane by liquid or gas backwash is essential to keep a longer membrane operation time without the need for a chemical cleaning stage. However, during each backwash, a certain amount of liquid waste is produced, which reduces the feed liquid recovery and increases the requirements on post treatment of backwash is waste. The liquid or gas backwash is also supplemented by periodic cleaning of the membranes using a chemical cleaning agent. This process again produces liquid waste which must be further treated or disposed of in an environmentally safe manner. It is thus desirable in any filtration operation to minimize the volume of waste liquid produced during the backwash and chemical cleaning phases of operation in order to reduce costs of operation and any environmental impact.

SUMMARY OF THE INVENTION

According one aspect the present invention provides a membrane filtration assembly including:

a membrane module having one or more permeable hollow membranes supported therein by at least one header, a filtrate collection chamber associated with said header and in fluid communication with lumens of said membranes for collecting filtrate withdrawn through said membrane lumens;

a filtration chamber for receiving feed liquid to be applied to the surface of membranes within said module, said filtration chamber enclosing said module and extending beyond the height of said module.

Preferably, the membranes extend between a pair of spaced, opposed headers. For preference, a filtrate collection chamber is associated with one or both of said headers. Preferably, said membranes are positioned vertically within said module and said headers are respective upper and lower headers. For preference, a filtrate carrier is provided between and in fluid communication with said filtrate collection chambers. Preferably, said filtrate carrier extends through said module between said headers. For preference, an opening or openings are provided in the upper header to allow the flow of fluid therethrough.

In one embodiment, said filtration chamber is closed at one end and open the other. In another embodiment, the open end of the filtration chamber is provided with a valve which allows gas flow therethrough while only allowing liquid flow into the filtration chamber, Preferably, the region defined between the filtration chamber and the module is filled with one or more filler elements. For preference an aeration backwash device is provided in fluid communication with said filtration chamber for selectively communicating gas and/or liquid to and/or from said filtration chamber.

BRIEF DESCRIPTION OF THE DRAWINGS

Preferred embodiments of the invention will now be described, by way of example only, with reference to the accompanying drawings in which.

DESCRIPTION OF PREFERRED EMBODIMENTS

Figure 1:
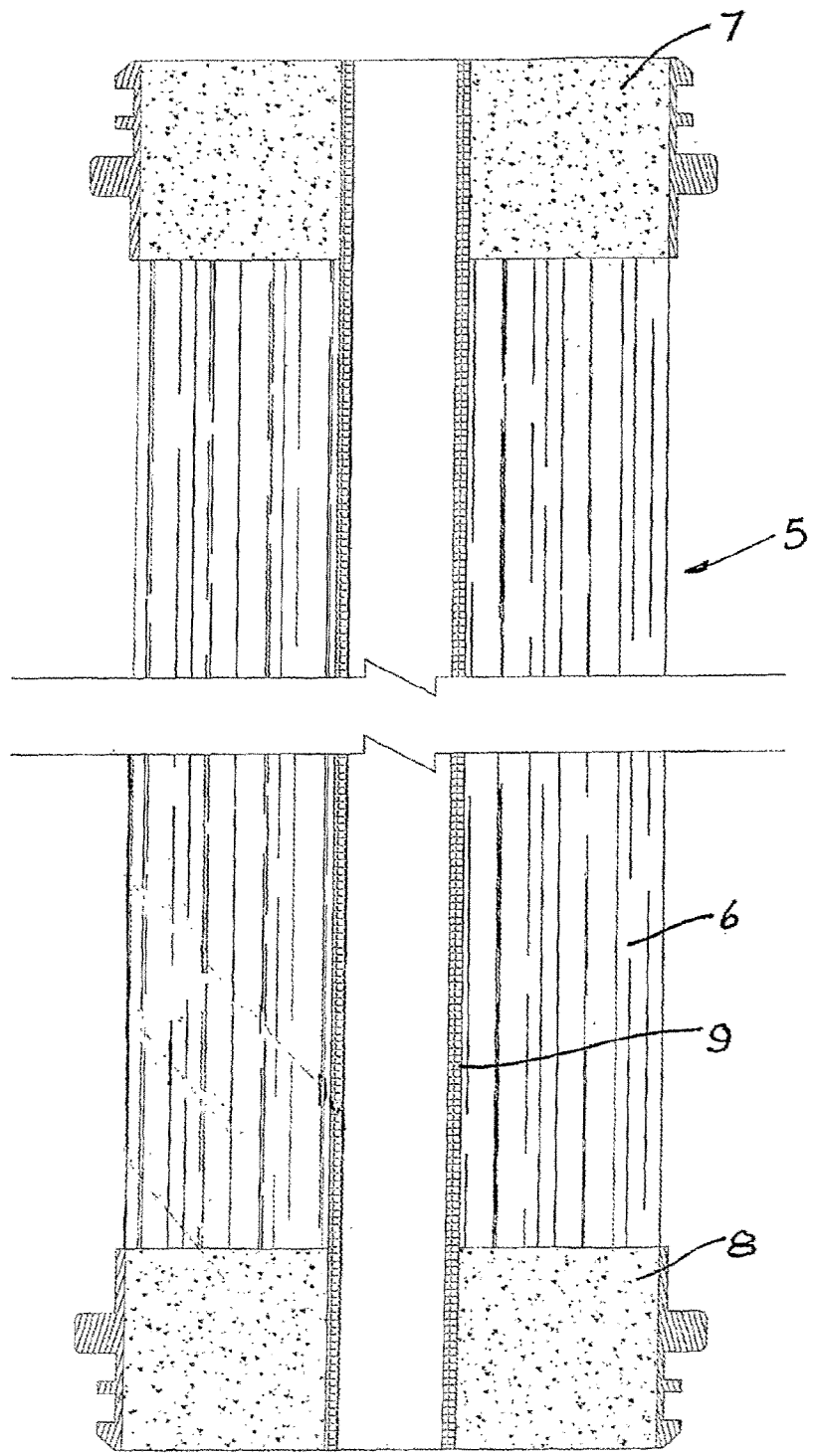
FIG. 1 shows a schematic sectional elevation view of a filtration module according to one embodiment of the invention.

Referring to FIG. 1, the membrane filtration module 5 according to one preferred embodiment consists of a bundle of hollow fiber membranes 6 potted at the top and bottom in upper and lower headers 7 and 8 respectively to expose the fiber membrane lumens to collect filtrate. It will be appreciated the fiber bundle may be potted at either or both ends, and further that the fiber lumens may be open at either or both ends. An opening or openings may be provided in the upper header to allow the flow of fluid therethrough.

A filtrate carrier 9 (typically a pipe or tube) extends between the upper and lower headers 7 and 8 to allow filtrate to be collected from either or both ends of the fiber membrane lumens. The carrier 9 may be of any shape in cross section and, though shown in this embodiment in the centre of the module 5, it may be located anywhere in the pot and in some embodiments the filtrate carrier 9 need not be located in the module 5 but can be connected through external connections as described below.

Figure 2:
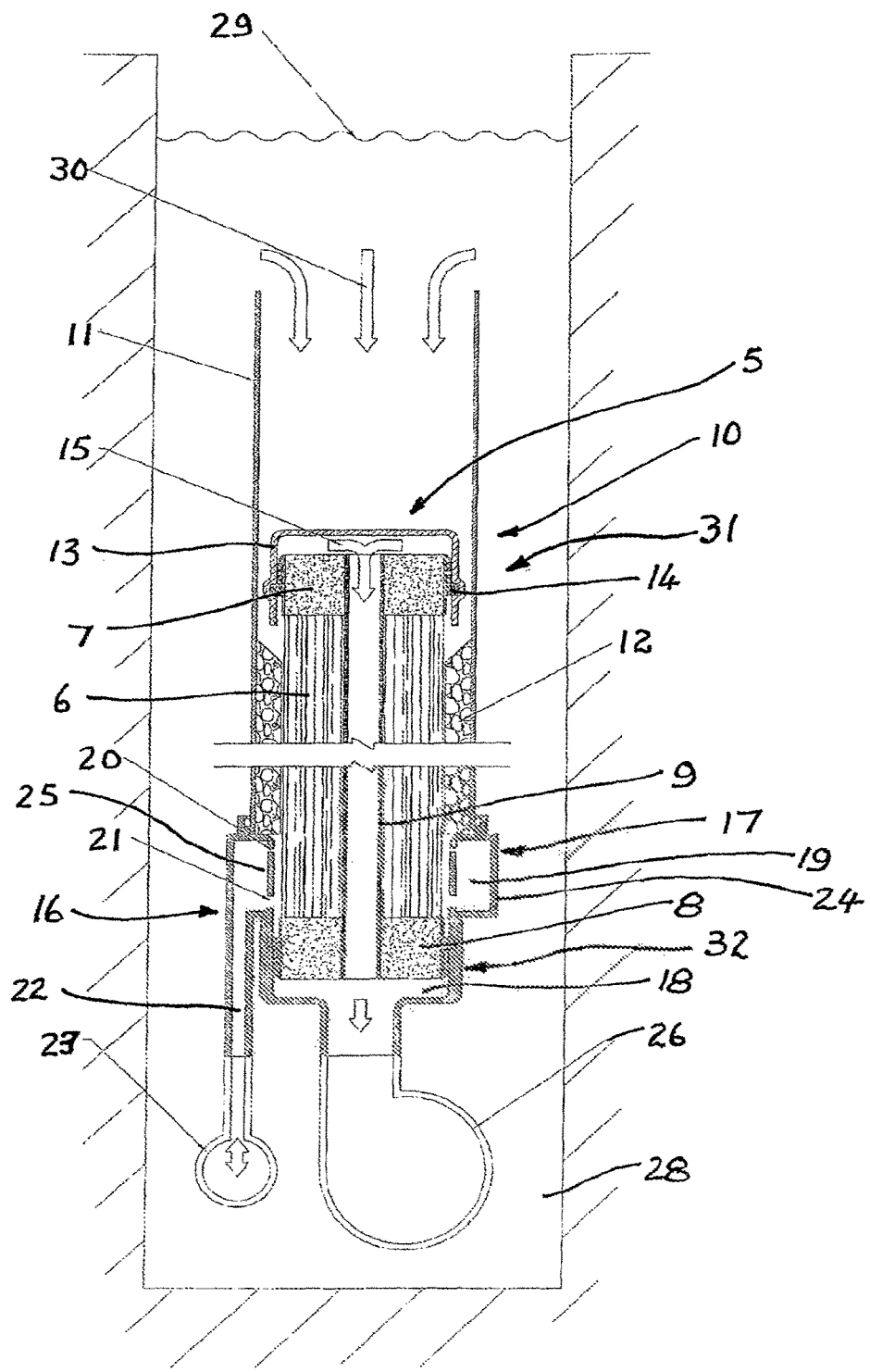
FIG. 2 shows a schematic sectional elevation view of the filtration assembly according to one embodiment of the invention operating in a gravity suction mode.
Figure 3:
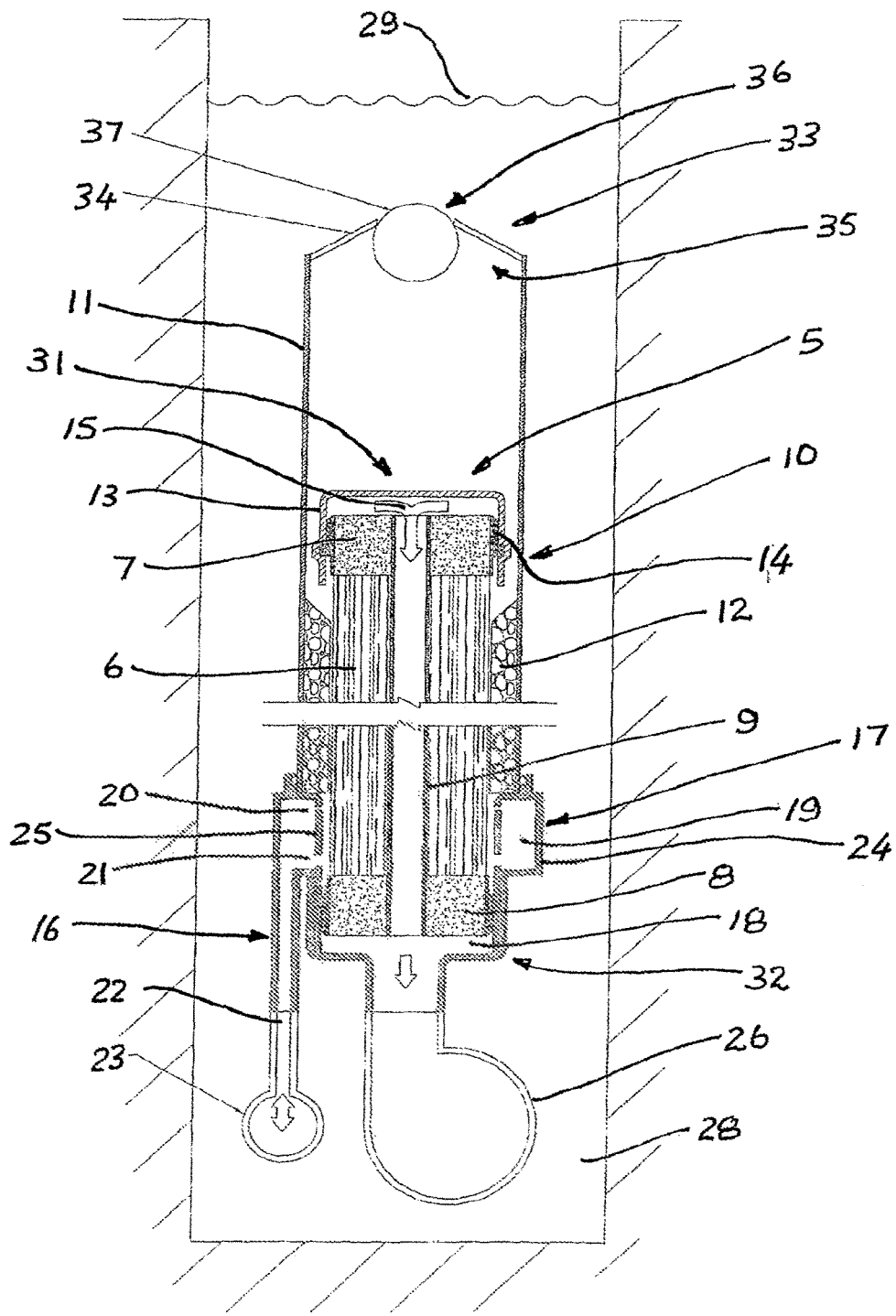
FIG. 3 shows a schematic sectional elevation view of the filtration assembly according to one embodiment of the invention operating in a pressurized mode.
Figure 4:
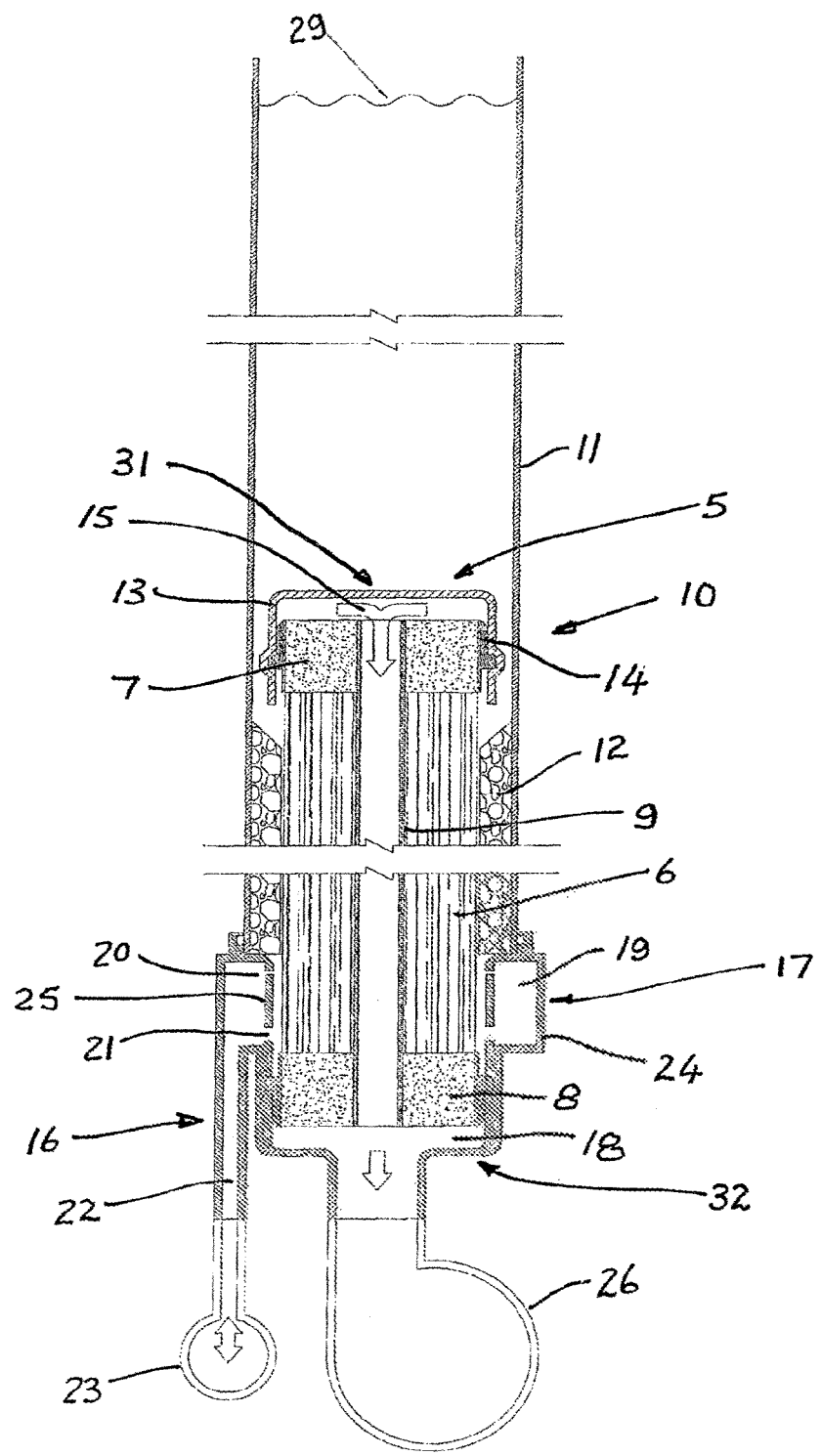
FIG. 4 shows a schematic sectional elevation view of the filtration assembly according to one embodiment of the invention operating in a high head mode.

Referring to FIGS. 2 to 4, the filtration assembly 10, according to a preferred embodiment of the invention, consists of a filtration chamber 11 higher than the module 5. If used in the high head filtration mode, as shown in FIG. 4, the filtration chamber 11 may be significantly higher than the module 5. The cross section of the filtration chamber UK preferably resembles the cross section of the module 5, however, when spacer fillers 12 are used, any cross section of the module may be accommodated. The filtration chamber 11 may be integrally formed as one piece or comprise multiple elements. The filtration chamber 11 preferably has a constant cross-section along its length, however, it may consist of multiple sections with a thicker cross section towards its base.

A spacer filler 12 with an exterior cross section closely resembling the cross section of the filtration chamber 11 and an internal cross section closely resembling the cross section of the module 5 is provided between the module 5 and the filtration chamber 11. The spacer filler 12 is not essential to the operation of the filtration assembly 10 but in the preferred embodiments is used to further reduce backwash and cleaning solution volumes. The spacer filler 12 may be formed from a single or multiple components.

A cap 13 is fitted to one end 14 of the module 5 to allow filtrate flow 15 from the end of the module 5 into the filtrate carrier 9.

A module mounting piece 16 is sealingly attached to lower end of the filtration chamber 11. The mounting piece 16 includes an aeration backwash device 17 and a filtrate collection chamber 18.

As indicated above, the filtrate carrier 9 need not be located within the module 5. Instead, external connections between the cap 13 and the filtrate collection chamber 18 or downstream thereof may be provided to allow for the collection of filtrate from the capped end of the module 5.

The aeration/backwash device 17, at least in part, surrounds a portion of the membrane module 5 above the lower header 8. The aeration/backwash to device 17 includes a communication chamber 19 having upper and lower through-openings 20 and 21 in fluid communication with the communication chamber 19 and the membrane module 5. It will be appreciated however that the function of the upper and lower through-openings may be performed by one or more elongate openings which are, preferably, varying in width and, more is preferably, are wider at the lower end than at the upper end. The communication chamber 19 is connected via a pipe 22 to a feed, aeration, backwash and draindown header 23. The communication chamber 19 in this embodiment is in the form of annulus 24 which provides for the selective aeration, feed and backwash with through-openings 20 and 21 in the inner wall 25 of the annulus 24 to allow the flow of gas, feed liquid, backwash liquid into the module 5 and draindown of waste liquid from the module 5. The annulus 24 may fully or partially surround the membrane module 5.

It will be appreciated that the functions of the module mounting piece 16 may provided by a single component or by multiple components.

A filtrate header 26 connects the filtrate collection chamber 18 from multiple modules together to a common outlet (not shown).

The aeration, feed, backwash and draindown header 23 connects the aeration gas, feed liquid, backwash and draindown liquids from multiple modules together to a common inlet/outlet (not shown).

Various modes of operation of this embodiment of the invention will now be described, by way of example only, with reference to FIGS. 2 to 4 of the drawings, respectively, Gravity Suction Mode Operation This mode of operation is illustrated in FIG. 2 of the drawings which shows the filtration assembly 10 located in a feed tank 28. Although, the assembly 33 is shown located in a tank 28, it will be appreciated that the tank 28 is merely one means of providing feed liquid to the filtration chamber 11 and other means such as pumping, flowing liquid from above and the like are equally applicable.

Filtration

The feed liquid level 29 in the surrounding feed tank 28 is raised higher than the filtration chamber 11 allowing feed liquid 30 to flow into the filtration chamber 11. Feed liquid may also be pumped through the aeration, feed, drain down and backwash header 23 and suction may be applied to the filtrate header 26. Significant pressure can be introduced by high feed levels in the feed tank 28.

The feed liquid flows down the filtration chamber 11 and is diverted into the module 5 by the spacer filler 12. The feed liquid is then filtered through the membranes 6 located in the module 5 and filtrate is recovered from the ends of the module 5. Filtrate from the capped end 31 of the module 5 flows through the filtrate carrier 9 to the bottom end 32 of the module 5 and into the filtrate header 26.

Aeration

During the aeration step, the feed liquid level 29 is lowered in the surrounding tank 28 to lower than the top of the filtration chamber 11. Gas, typically air, is then introduced through the aeration, feed, drain down and backwash header 23 to aerate the membrane module 5. The gas flows into the communication chamber 19 and is directed into the membrane module 5 through the aeration holes 20 in the module mounting piece 16. The gas forms bubbles which scrub the membrane surfaces as they rise through the module 5. The feed liquid level in the filtration chamber 11 is arranged such that, during aeration, no feed liquid is able to escape from the filtration chamber 11 into the feed liquid in the surrounding tank 28.

Feed Backwash

During the feed backwash process, the feed liquid level 29 is lowered in the surrounding tank 28 to lower than the top of the filtration chamber Backwash liquid is then introduced through the aeration, feed, drain down and backwash header 23. The backwash liquid flows into the communication chamber 19 and is directed into the membrane module 5 through the feed backwash holes 21 in the module mounting piece 16. The backwash liquid then scrubs the membrane surfaces as it rises through the module 5. The feed liquid level 29 in the filtration chamber 11 is arranged such that, during backwash, no feed liquid is able to escape from the filtration chamber 11 into the feed liquid in the surrounding tank 28.

In an alternative feed backwash process, backwash feed liquid is introduced into the filtration chamber by raising the feed level 29 in the tank 28 such that it overflows into the filtration chamber. The backwash liquid flows through the module 5 and out through the aeration, feed, drain down and backwash header 23. Suction may be applied to the backwash header.

Permeate Backwash

During the permeate backwash process, the feed liquid level 29 is lowered in the surrounding tank to lower than the top of the filtration chamber 11. Feed is drained from inside the filtration chamber 11 and permeate is introduced through pressurizing the filtrate header 26 with permeate. The permeate backwash liquid flows through into lumens and out through the walls of the fibers removing solids from the surfaces of the fibers. During this step, permeate backwash liquid and solids may be drained through the communication chamber 19 and into the aeration, feed, drain down and backwash header. The rate of introduction of the permeate backwash liquid is arranged such that, during permeate backwash, no permeate backwash liquid is able to escape from the filtration chamber 11 into the feed liquid surrounding the tank 28.

Drain Down

After either or both of aeration and backwash the liquid and solids in the filtration chamber 11 are drained out through the holes 20 and 21 in the module mounting piece 16 into the aeration, feed, drain down and backwash header 23.

Pressurized Mode Operation

As shown in FIG. 3, for operation in pressurized mode, an assembly 33 is provided on the top end of the filtration chamber 11 that allows liquid to flow only into the filtration chamber 11 but not out thereof and allows gas to flow in both directions. In this embodiment, the assembly 33 consists of a sealing cone 34 which seals onto the open end 35 of the filtration chamber 11 with an opening 36 therein which is smaller than a sealing ball 37. The sealing ball 37, which has an effective density less than the feed liquid, is located and moves freely within the filtration chamber 11.

It will be appreciated by those in the art that a variety of valve arrangements can be used to achieve the required function.

Although, the assembly 33 is shown located in a tank 28, it will be appreciated that the tank 28 is merely one means of providing feed liquid to the filtration chamber 11 and other means such as pumping, flowing liquid from above and the like are equally applicable.

Filtration

During filtration, the feed liquid is introduced to the filtration chamber 11 through the aeration, drain down and backwash header 23, and suction may be is applied to the filtrate header 26. As the level of the feed liquid in the filtration chamber 11 is raised the sealing ball 37 floats up to seal against the sealing cone 34 and closing opening 36, thereby allowing the filtration chamber 11 to be pressurized.

The feed liquid is then filtered through the membranes 6 in the module 5 and filtrate is recovered from the ends of the module 5. Filtrate from the capped end 31 of the module 5 flows through the filtrate carrier 9 to the bottom end 32 of the module 5 and into the filtrate header 26.

Aeration

During the aeration step, the feed liquid level 29 is lowered in the filtration chamber 11, so that the sealing ball 37 is no longer in contact with the sealing cone 34 and the filtration chamber 11 is depressurized. Gas is then introduced through the aeration, feed, drain down and backwash header 23. The gas flows into the communication chamber 19 and is directed into the module 5 through the aeration holes 20 in the module mounting piece 16. The gas forms bubbles which scour the membrane surfaces as they rise through the module 5. The feed liquid level in the filtration chamber 11 is arranged such that, during aeration, no feed liquid is able to escape from the filtration chamber 11 into the feed liquid in the surrounding tank 28.

Feed Backwash

During the backwash process, the feed liquid level is lowered in the filtration chamber 11, so that the sealing ball 37 is no longer in contact with the sealing cone 34 and the filtration chamber 11 is depressurized. The feed liquid level in the surrounding tank 28 is arranged such that feed liquid overflows into the filtration chamber to backwash the module. The backwash feed liquid flows is through the module removing solids from the surfaces of the fibers. The backwash liquid drains through the aeration, feed, drain down and backwash header 23. Suction may be applied to the backwash header.

Permeate Backwash

During the permeate backwash process, feed is drained from inside the filtration chamber 11 and permeate is introduced through pressurizing the filtrate header 26 with permeate. The permeate backwash liquid flows through into lumens and out through the walls of the fibers removing solids from the surfaces of the fibers. During this step, permeate backwash liquid and solids may be drained through the communication chamber 19 and into the aeration, feed, drain down and backwash header. The rate of introduction of the permeate backwash liquid is arranged such that, during permeate backwash, no permeate backwash liquid is able to escape from the filtration chamber 11 into the feed liquid surrounding the tank 28.

Drain Down

After either or both of aeration and backwash the liquid and solids in the filtration chamber 11 are drained out through the holes 20 and 21 in the module mounting piece 16 into the aeration, feed, drain down and backwash header 23.

High Head Mode Operation

As shown in FIG. 4, for high head mode operation the filtration chamber 11 is extended significantly beyond the height of the module 5 such that, when the filtration chamber 11 is filled, a significant pressure is generated across the filtration surfaces of the membranes.

Filtration

During the filtration step, the feed liquid is introduced to the filtration chamber 11, via the module 5, through the aeration, feed, drain down and backwash header 23, or directly into the filtration chamber until the feed liquid level fills the filtration chamber 11. Suction may also be applied to the filtrate header 26.

The feed liquid is then filtered through the membranes 6 located in the module 5 and filtrate is recovered from the ends of the module 5. Filtrate from the capped end 31 of the module 5 flows through the filtrate carrier 9 to the bottom end 32 of the module 5 and into the filtrate header 26. The feed liquid is introduced at such a rate that the level in the filtration chamber 11 stays within controlled limits maintaining sufficient pressure for filtration.

Aeration

Gas is introduced through the aeration, feed, drain down and backwash header 23. The aeration gas flows into the communication chamber 19 and is directed into the module through the aeration holes 20 in the module mounting piece 16. The gas forms bubbles which scour the surfaces of the membranes 6 as they rise though the module 5.

Feed Backwash

Backwash liquid is introduced through the aeration, feed, drain down and backwash header 23. The backwash liquid flows into the communication chamber 19 and is directed into the module 5 through the feed/backwash holes 21 in the module mounting piece 16. The backwash liquid scrubs the surfaces of the membranes as it rises though the module 5.

Permeate Backwash

During the permeate backwash process, the feed liquid level 29 is lowered in the surrounding tank 28 to lower than the top of the filtration chamber 11. Feed is drained from inside the filtration chamber 11 and permeate is introduced through pressurizing the filtrate header 26 with permeate. The permeate backwash liquid flows through into the lumens of the fibers 6 and out through the walls of the fibers removing solids from the surfaces of the fibers. During this step, permeate backwash liquid and solids may be drained through the communication chamber 19 and into the aeration, feed, drain down and backwash header.

Drain Down

After either or both of aeration and backwash the liquid and solids in the filtration chamber 11 are drained out through the holes 20 and 21 in the module mounting piece 16 into the aeration, feed, drain down and backwash header 23.

It will be appreciated that the various backwashing processes and steps described above may be performed in a variety of combinations and sequences depending on the operating outcomes desired by the user.

It will be appreciated that further embodiments and exemplifications of the invention are possible without departing from the spirit or scope of the invention described.

What is claimed is:

1. A method of treating a feed liquid, the method comprising:
   introducing the feed liquid to be treated into a filtration chamber of a membrane filtration system including:
   a membrane module having one or more permeable hollow membranes extending between an upper header and a lower header of the membrane module, the membrane module being located in the filtration chamber, the filtration chamber having an open upper end located above the upper header of the membrane module and a closed lower end, and
   a feed tank surrounding the filtration chamber and configured to provide the feed liquid through the open upper end of the filtration chamber;
   applying the feed liquid to surfaces of the one or more membranes within the membrane module;
   producing a pressure differential across membrane walls of the one or more membranes;
   filtering the feed liquid through the membrane walls into lumens of the one or more membranes as filtrate; and
   withdrawing the filtrate from the lumens of the one or more membranes.

2. The method of claim 1, further comprising providing feed liquid into the filtration chamber by raising the level of the feed liquid within the feed tank to a level above the open upper end of the filtration chamber.

3. The method of claim 1, further comprising flowing gas bubbles past the surfaces of the one or more membranes to aerate the membranes within the membrane module.

4. The method of claim 3, further comprising preventing liquid flow from the filtration chamber during aeration of the one or more membranes.

5. The method of claim 3, further comprising lowering a level of the feed liquid within the feed tank to below a level below the open upper end of the filtration chamber before aerating the one or more membranes.

6. The method of claim 1, further comprising flowing feed liquid past the surfaces of the one or more membranes to backwash the membranes within the membrane module.

7. The method of claim 6, further comprising preventing liquid flow from the filtration chamber during the backwashing of the one or more membranes.

8. The method of claim 6, further comprising lowering the level of the feed liquid within the feed tank to a level below the open upper end of the filtration chamber before backwashing the one or more membranes.

9. The method of claim 6, further comprising flowing the feed liquid out of the membrane module through at least one opening in at least one of the upper and lower headers.

10. The method of claim 6, further comprising raising a level of the feed liquid within the feed tank to a level above the open upper end of the filtration chamber to cause the feed liquid to flow into the filtration chamber before and/or during the backwashing of the one or more membranes.

11. The method of claim 1, further comprising performing a filtrate liquid backwash operation including:
    suspending filtering the feed liquid through the membrane walls;
    flowing filtrate into the lumens and through the membrane walls to remove an accumulation of solids from the one or more membranes and form a backwash liquid containing removed accumulated solids; and
    removing the backwash liquid containing the removed accumulated solids from the filtration chamber.

12. The method of claim 11, further comprising:
    lowering a level of the feed liquid within the feed tank to a level below the open upper end of the filtration chamber before performing a backwashing operation on the one or more membranes; and
    arranging a rate of flow of filtrate backwash liquid into the filtrate chamber and a rate of removal of filtrate backwash liquid from the filtration chamber such that no filtrate backwash liquid flows from the filtration chamber into the feed tank.

13. The method of claim 1, further comprising removing liquid from the filtration chamber following at least one of aerating the one or more membranes and backwashing the one or more membranes.

14. A method of filtering a feed liquid, the method comprising:
    introducing the feed liquid into a filtration chamber of a membrane filtration system including:
    a membrane module having one or more permeable hollow membranes extending between an upper header and a lower header of the membrane module, the membrane module being located in the filtration chamber, the filtration chamber having an open upper end located above the upper header of the membrane module and a closed lower end and a feed tank surrounding the filtration chamber and configured to provide the feed liquid through the open upper end of the filtration chamber;
    allowing a gas to flow into and out of the filtration chamber through a valve at the upper open end of the filtration chamber;
    providing the feed liquid to the filtration chamber such that the valve at the upper open end in the filtration chamber closes and prevents liquid flow out of the filtration chamber;
    applying the feed liquid to surfaces of the one or more membranes within the membrane module;
    pressurizing the filtration chamber and producing a pressure differential across walls of the one or more membranes by continuing to provide the feed liquid to the filtration chamber;
    filtering the feed liquid through walls of the one or more membranes into lumens of the membranes as filtrate; and
    withdrawing the filtrate from the membrane lumens of the one or more membranes.

15. The method of claim 14, further comprising:
    opening the valve to depressurize the filtration chamber; and
    flowing gas bubbles past the surfaces of the membranes to aerate the one or more membranes within the membrane module.

16. The method of claim 14, further comprising performing a feed liquid backwash operation including:
    opening the valve to depressurize the filtration chamber; and
    flowing the feed liquid past the surfaces of the one or more membranes to backwash the one or more membranes within the membrane module.

17. The method of claim 16, further comprising:
    opening the valve before a feed liquid backwashing operation begins by lowering a level of the feed liquid within the feed tank to a level below the open upper end of the filtration chamber; and preventing liquid flow from the filtration chamber into the feed tank during the feed liquid backwashing operation.

18. The method of claim 14, further comprising performing a feed liquid backwash operation including:
opening the valve of the filtration chamber to depressurize the filtration chamber and cause the feed liquid to flow into the filtration chamber lowering a level of the feed liquid within the feed tank while maintaining the level of the feed liquid above the open upper end of the filtration chamber; and
flowing the feed liquid within the filtration chamber past the surfaces of the one or more membranes to backwash the one or more membranes within the membrane module.

19. The method of to claim 18, further comprising flowing the feed liquid out of the membrane module through at least one opening in at least one of the upper and lower headers.

20. The method of claim 14, further comprising performing a filtrate liquid backwash operation including:
suspending filtering the feed liquid through the walls of the one or more membranes;
flowing filtrate into the lumens of the membranes and through the walls of the membranes to remove an accumulation of solids from the one or more membranes and form a backwash liquid containing removed accumulated solids; and
removing the backwash liquid containing the removed accumulated solids from the filtration chamber.

21. The method of claim 20, further comprising:
lowering the level of the feed liquid within the feed tank before the filtrate liquid backwash operation to open the valve and depressurize the filtration chamber; and
arranging a rate of flow of filtrate backwash liquid into the filtration chamber and a rate of removal of filtrate backwash liquid from the filtration chamber such that no filtrate liquid flows from the filtration chamber into the feed tank.

22. The method of claim 14, further comprising removing liquid from the filtration chamber following at least one of an aeration operation and a backwash operation.

\* \* \* \* \*